Dec. 26, 1944. S. F. SWORSKI 2,365,784
PORTABLE ELECTRICAL WELDING TOOL
Filed Oct. 12, 1942
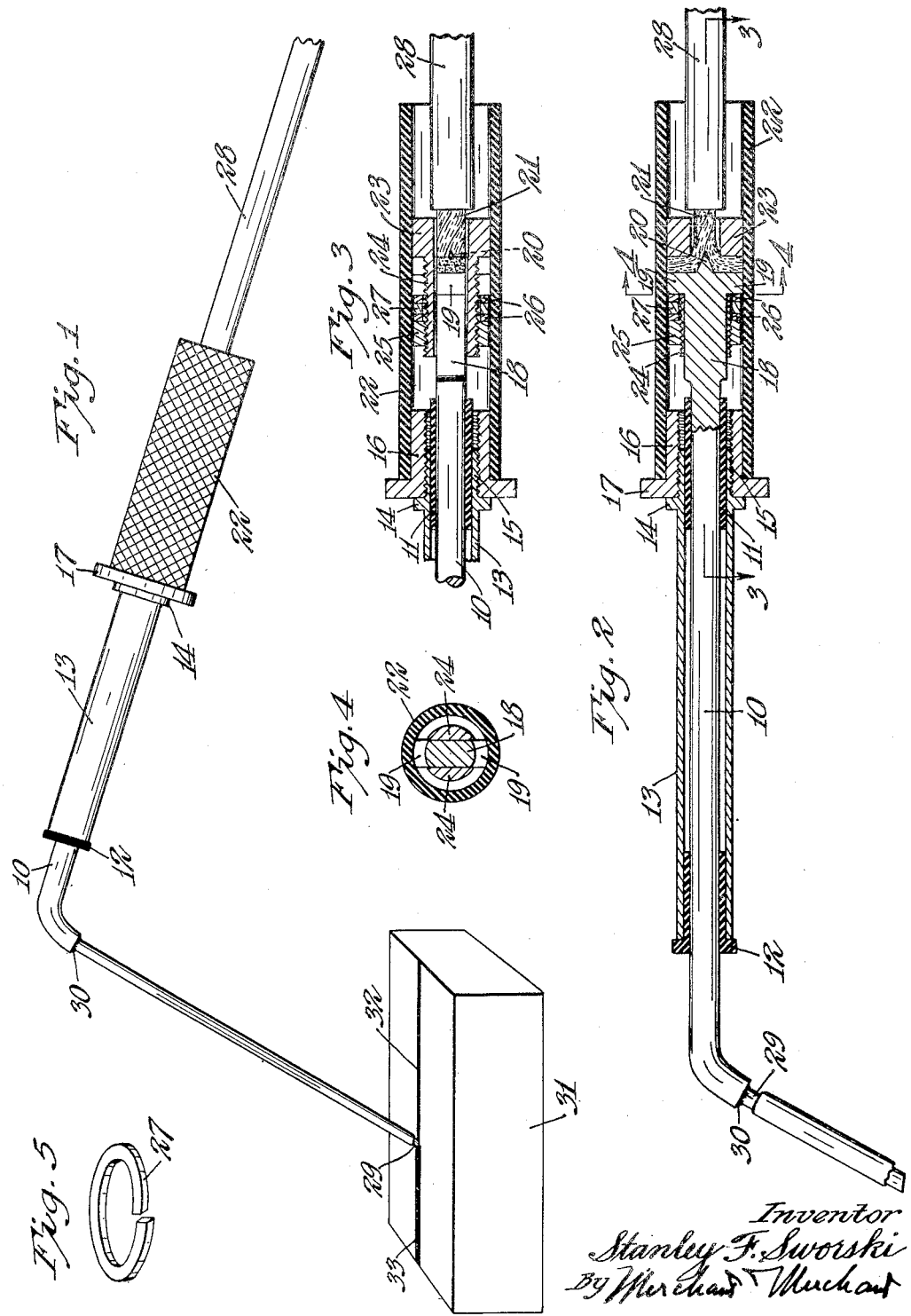
Inventor
Stanley F. Sworski
By Merchant & Merchant
Attorneys Patented Dec. 26, 1944

2,365,784

UNITED STATES PATENT OFFICE 2,365,784

PORTABLE ELECTRICAL WELDING TOOL

Stanley F. Sworski, Minneapolis, Minn.

Application October 12, 1942, Serial No. 461,694

1 Claim. (Cl. 219—8)

My invention provides an extremely simple and highly efficient electrical welding tool and, generally stated, consists of the novel devices, combinations of devices, and arrangement of parts hereinafter described and defined in the claim.

As an important feature of the improved device the electrode, which is in the nature of a welding rod, is welded directly to the end of the conducting rod of the device so that the former constitutes an integral extension of the latter and may be used up in welding operations until its length and projection from the conducting rod is nil. The invention also includes an improved connection between the welding rod and the supply cable and the manner of encasing the same within a handle of insulating material.

A commercial form of the invention is illustrated in the accompanying drawing wherein like characters indicate like parts throughout the several views.

Referring to the drawing:

Fig. 1 shows the improved welding tool in side elevation and illustrates the manner of using the same to weld a joint of a metallic object;

Fig. 2 is a longitudinal axial section of the improved welding tool, some of the parts being shown in full;

Fig. 3 is a section taken on the line 3—3 of Fig. 2;

Fig. 4 is a transverse section taken on the line 4—4 of Fig. 2; and

Fig. 5 is a perspective showing a split washer that serves the double function of a spring or tension device and a nut lock.

The conducting rod of the device is indicated as an entirety by the numeral 10. The intermediate portion of this conducting rod is passed through insulating bushings 11 and 12 telescoped into a metallic tube 13, one end of which is provided with a stop flange 14 and beyond said flange has a threaded shank 15. Screwed onto the threaded end 15 of the tube 13 is a collar 16, the flanged outer end 17 of which is tightly screwed against the stop flange 14 of said tube 13.

The conducting rod 10, at its inner end, is provided with a flattened shank 18 and at the termination of said shank with diametrically projecting stop lugs or portions 19. At its exposed inner face the head is shown as provided with a wedge-like lug 20 for direct engagement with the divided ends of a multi strand supply wire or lead 21.

The numeral 22 indicates a tubular casing of insulating material which is telescoped over the collar 16 and over the flattened head 18—19 of the conducting rod 10. Telescoped into the tubular casing 22 is a centrally perforated or tubular clamping head 23 that is formed with an externally threaded segmental sleeve 24 made up of tube segments that are circumferentially spaced so as to straddle or telescope over the flattened stem portion 18 of the conducting rod 10. The inner end of conducting cable 21 is passed through the axial perforation of clamping head 23 and its ends are spread between said clamping head and the flattened head portion 19 of rod 10. A clamping nut 25 works with threaded engagement on the segments of the split sleeve 24. Placed around the segments of the sleeve 24 between the clamping nut 25 and the diametrically projected lugs 19 of the rod 10 is a pair of washers 26 and between said washers is placed a split spring-acting ring or washer 27, which latter is shown in detail in Fig. 5.

When the nut 25 is tightened the head 23 will be tightly clamped against and will flatten out the prongs of the multi strand conducting wire 21 and the wedge-shaped point 20 will be wedged into tight engagement with the conducting wire. Furthermore, when said nut 25 is tightened, the spring-acting ring or washer 27 will be compressed into flat form but will constantly exert pressure against the washers 26 and keep the head 23 tightly clamped against the ends of the conducting wire. The spring ring or washer 27, when thus compressed, will remain under tension pressing the washers 26 tightly against the nut and the prongs 19 and will thereby frictionally tend to hold the nut 25 against loosening. The conducting wire 21 is shown as contained within a flexible insulating tube or coating 28.

The welding rod 29, which operates as a delivery electrode, is permanently welded to the end of the conducting wire 10, as shown in Figs. 1 and 2, so that this welding rod becomes an integral extension of the conducting rod. In Figs. 1 and 2 the weld between the rod 29 and the conducting wire is indicated at 30. Preferably, the welding rod is externally coated with a flux which, under intense heat, will crumble away as the rod is used up in the welding process. In Fig. 1 a metallic shell is indicated by the numeral 31 and its seam to be welded is indicated by the numeral 32, and the welded seam is indicated by the numeral 33.

The device described may be readily assembled and easily handled. When the one welding rod is used up or reduced or practically reduced to the end of the conducting rod, another welding rod may be substituted therefor and welded to the conducting rod. When the welding rod is thus connected it becomes a rigid, integral extension of the conducting rod and such substitutions are made without the elimination of any removable part of the holder proper. The insulating casing 22 covers all the parts that are subject to electric current and affords a very convenient handle for holding the device while it is being used in the welding operation. In Fig. 1 the casing 22 is shown as knurled or roughened by intersecting lines but such a feature constitutes no part of the present invention.

What I claim is:

In a welding device of the kind described, a casing having a tubular handle portion of insulating material, a conducting rod extended through and projecting from said casing and insulated therefrom, said rod, at its inner end, having a flattened head with an axially located wedge and diametrically projecting lugs, a tubular clamping head within said casing formed with externally threaded circumferentially spaced segmental sleeve portions that are telescoped around the flattened head portion of said conducting rod, a conducting wire having pronged inner end portions spread by said wedge and clamped between said clamping head portions, said wedge, on the head of said conducting rod, serving to spread the inner ends of said conducting wire against the diametrically extended prongs on the head of said conducting rod, a clamping nut working with threaded engagement on the segmental sleeve portions of said clamping head, and a spring element compressed between said clamping nut and the projecting lugs of the head of said conducting rod, said spring serving to yieldingly apply pressure to the ends of said conducting wire, and said nut serving to adjust the pressure thus produced by said spring, and a welding rod welded directly to the projected other end of the conducting rod.

STANLEY F. SWORSKI.